(12) United States Patent
Yano (10) Patent No.: US 8,215,637 B2
(45) Date of Patent: Jul. 10, 2012

(54) SHEET CONVEYING APPARATUS, IMAGE FORMING APPARATUS AND METHOD OF CONTROLLING A SHEET CONVEYING APPARATUS

(75) Inventor: Takashi Yano, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 12/758,307

(22) Filed: Apr. 12, 2010

(65) Prior Publication Data

US 2010/0276863 A1    Nov. 4, 2010

(30) Foreign Application Priority Data

Apr. 30, 2009    (JP) ................... 2009-111009

(51) Int. Cl.
*B65H 9/00* (2006.01)
(52) U.S. Cl. ......... 271/226; 271/242; 271/245; 271/301
(58) Field of Classification Search ............. 271/226, 271/227, 242, 245, 301
See application file for complete search history.

(56) References Cited

U.S. PATENT DOCUMENTS

| | | | |
|---|---|---|---|
| 6,260,840 B1 | 7/2001 | Suga et al. | |
| 6,382,622 B1 | 5/2002 | Takada et al. | |
| 6,467,767 B2 | 10/2002 | Yano | |
| 6,826,383 B2 | 11/2004 | Yano | |
| 6,988,727 B2 | 1/2006 | Yano | |
| 7,467,793 B2 * | 12/2008 | Tanabe | 271/245 |
| 7,537,210 B2 | 5/2009 | Kawaguchi | |
| 7,938,399 B2 | 5/2011 | Kawaguchi | |
| 2007/0273090 A1 | 11/2007 | Kawaguchi | |

FOREIGN PATENT DOCUMENTS

| | | | |
|---|---|---|---|
| CN | 101077745 A | * | 11/2007 |
| JP | 11-165915 A | | 6/1999 |
| JP | 2003-155146 A | | 5/2003 |

* cited by examiner

*Primary Examiner* — Michael McCullough
(74) *Attorney, Agent, or Firm* — Fitzpatrick, Cella, Harper & Scinto (57) ABSTRACT

A sheet conveying apparatus has a conveyance portion configured to convey a sheet along a conveyance path; a skew-feed correction member positioned in the conveyance path such that a leading edge of the sheet conveyed by the conveyance portion contacts the skew-feed correction member to correct a skew-feed of the sheet; a receiving portion configured to receive information indicative of the width of the conveyed sheet, the width being in a direction orthogonal to a sheet conveyance direction; and a control portion configured to adjust a skew-correction conveyance amount of the conveyance portion applied to correct the skew-feed of the sheet by the skew-feed correction member. The skew-correction conveyance amount is adjusted on information which the receiving portion receives such that the skew-correction conveyance amount is set to be larger for a sheet of smaller width compared to a sheet of greater width.

26 Claims, 8 Drawing Sheets

| WIDTH SIZE / BASIS WEIGHT | A5R (148mm) OR LESS | MORE THAN A5R (148mm) AND LTR-R (216mm) OR LESS | MORE THAN LTR-R (216mm) |
|---|---|---|---|
| SMALL | T1 | T2 | T3 |
| MEDIUM | T4 | T5 | T6 |
| LARGE | T7 | T7 | T7 |

SHEET CONVEYING APPARATUS, IMAGE FORMING APPARATUS AND METHOD OF CONTROLLING A SHEET CONVEYING APPARATUS

BACKGROUND OF THE INVENTION

1. Field of the Invention

The present invention relates to a sheet conveying apparatus including a skew-feed correction member for correcting a skew-feed of a sheet, and to an image forming apparatus including the sheet conveying apparatus.

2. Description of the Related Art

An image forming apparatus such as a copier, a laser printer, an LED printer, a facsimile machine, a word processor, and a multifunctional printer (which is a combination of two of more thereof) that forms an image on a sheet by using an electrophotographic image forming method is previously known.

In the conventional image forming apparatus, while accuracy of an image forming position with respect to the sheet (hereinafter, referred to as an image forming position accuracy) is one of important image quality factors, the image forming position accuracy is deteriorated when the sheet is skew-fed (so becomes skewed during conveyance of the sheet). Accordingly, it has been known to correct a skew-feed of the sheet by a skew-feed correction member before the image is formed on the sheet by an image forming portion.

The strike method is a typical skew-feed correction method for the sheet. In the strike method the sheet is conveyed by a conveying roller provided upstream of a skew-feed correction roller, for example, in a conveyance direction so that a leading edge of the sheet can strike the skew-feed correction roller that is stopped. The leading edge of the sheet strikes the stopped skew-feed correction roller, whereby the leading edge of the sheet is aligned by the skew-feed correction roller (as the conveying roller continues to rotate). After that, the skew-feed correction roller starts to rotate, and the sheet is conveyed. With regard to the timing of when the skew-feed correction roller that has been stopped starts to rotate, generally the skew-feed correction roller starts to rotate after the elapse of a predetermined time (period) since the sheet conveyed by the conveying roller is detected by a sensor.

The applicant has recognized that as a sheet width (a sheet length in a direction orthogonal to the conveyance direction of the sheet) becomes smaller, a total abutment pressure between the sheet and the conveying roller is reduced. This is because a contact region between the conveying roller and the sheet is reduced. Hence the sheet conveying force when the conveying roller conveys the sheet is decreased as the sheet width becomes smaller. In other words, as the sheet width becomes smaller, a conveyance stability of the conveying roller is decreased (so the conveyance stability of a sheet of smaller width is decreased with respect to a sheet of greater width). The sheet conveyed by the conveying roller receives a sliding friction caused by a guide. Accordingly, a conveyance efficiency of the sheet and an amount of skew-feed thereof that can occur while the above-mentioned conveying roller is conveying the sheet varies depending on a difference in a width of the sheet to be conveyed. The conveyance efficiency refers to a ratio of an actually fed amount of the sheet by the conveying roller with respect to a conveyance amount by which the sheet is supposed to be conveyed by rotation of the conveying roller. The sheet conveying force is weaker and a slippage is more prone to occur between the sheet and the conveying roller for a sheet of smaller width. Therefore a skew-feed amount is increased, and the conveyance efficiency is decreased for a sheet of smaller width.

Consequently the skew-feed amount may be increased at the time of conveying a narrow sheet, and accordingly, skew-feed correction may not be sufficiently performed because a pair of skew-feed correction rollers may start to rotate before the leading edge of the sheet is aligned with the pair of skew-feed correction rollers. The applicant has internally considered delaying a time when the pair of skew-feed correction rollers start to rotate so that the leading edge of the narrow sheet can be sufficiently aligned with the pair of skew-feed correction rollers. However, in this case, when a wide sheet is conveyed, an amount by which the conveying roller feeds the wide sheet after a leading edge thereof strikes the pair of skew-feed correction rollers is increased. Accordingly, the sheet may be damaged between the conveying roller and the pair of skew-feed correction rollers. For example, an excessive loop may be formed on the sheet between the conveying roller and the pair of skew-feed correction rollers, the loop thus formed may excessively contacts a conveying guide, and the sheet may buckle. Such sheet buckling may generate noise.

Further, the applicant has recognized that when such a width size of the sheet is small, the conveyance efficiency of the sheet is decreased. Accordingly, it takes more time for the conveyed sheet to reach the skew-feed correction rollers after passing through the sensor. Hence, when control is performed so that the pair of skew-feed correction rollers can start to rotate after the sensor detects the sheet and the skew-feed correction is performed appropriately for the wide sheet, the pair of skew-feed correction rollers start to rotate before the leading edge of the narrow sheet is aligned with the pair of skew-feed correction rollers. Hence, the skew-feed correction may not be sufficiently performed for the narrow sheet. Meanwhile the applicant has also recognized that, when the control is performed so that the pair of skew-feed correction rollers can start to rotate after the sensor detects the sheet and the skew-feed correction is performed appropriately for the narrow sheet, there are the following problems. Specifically, when the wide sheet is conveyed, the amount by which the conveying roller feeds the wide sheet after the leading edge thereof strikes the pair of skew-feed correction rollers is increased, and accordingly, the sheet may be damaged between the conveying roller and the pair of skew-feed correction rollers. For example, an excessive loop may be formed in the sheet between the conveying roller and the pair of skew-feed correction rollers, whereby the sheet may buckle. Further, noise occurs following such buckling.

As described above, the applicant has recognized that, depending on the sheet width, there occur problems that a sufficient skew-feed correction effect may not be obtained, and that the sheet may be damaged at the time of the skew-feed correction.

In Japanese Patent Application Laid-Open No. H11-165915, a time when the roller struck by the sheet to be conveyed is stopped is shortened in an order of from JIS B4 through JIS A4 to a postcard size (so as the width decreases) to reduce a loop amount. The loop amount refers to an amount by which the roller arranged upstream of the roller struck by the sheet feeds the sheet during a period from a time when the leading edge of the sheet strikes the roller concerned to a time when the roller starts to rotate. However, the technology and technique disclosed in Japanese Patent Application Laid-Open No. H11-165915, do not address or solve the above-mentioned problems, which, as the applicant has recognized, are caused because the skew-feed is more prone to occur in the sheet and the conveyance efficiency of the sheet is also decreased when the width size of the sheet to be conveyed is reduced.

In recent years, in line with miniaturization of image forming apparatuses, there has been proposed an image forming apparatus having a configuration in which a sheet discharge roller that discharges the sheet to a sheet discharge tray is also used as a reversing roller used at the time of two-sided image formation (refer to Japanese Patent Application Laid-Open No. 2003-155146). If the sheet conveying force (a sheet discharging force) is too large, the sheet discharge roller (a reversing roller) sometimes disturbs stacking regularity of sheets previously stacked on the sheet discharge tray, and when the leading edge of the discharged sheet strikes a surface of the sheet discharge tray, the sheet sometimes curls. If nipping force to nip the sheet is increased in order to increase the sheet conveying force of the sheet discharge roller, then the image on the sheet may be damaged by the sheet discharge roller that contacts the sheet soon after the image is fixed. Because of the reasons as described above, the conveying force of the sheet discharge roller is sometimes set relatively small. Hence, when the sheet discharge roller conveys a narrow sheet (of narrow width), slippage is prone to occur between the sheet and the sheet discharge roller, and the above-mentioned phenomena that the skew-feed occurs to a large extent and the conveyance efficiency is decreased may become significant. Hence, in the case of a configuration in which the sheet discharge roller (the reversing roller) conveys the sheet so that the leading edge of the sheet strikes the skew-feed correction roller, the above-mentioned problem identified by the applicant and caused by the difference in width of the sheet at the time of the skew-feed correction for the sheet may become significant.

SUMMARY OF THE INVENTION

The present invention has been made in consideration of the actual circumstances as described above. An embodiment of the present invention provides a sheet conveying apparatus capable of correcting the skew-feed of the sheet with reliability regardless of the length of the sheet in the width direction (so the width of the sheet), and provides an image forming apparatus including the sheet conveying apparatus.

The present invention provides a sheet conveying apparatus for conveying sheets of different widths. The apparatus has a conveyance portion configured to convey a sheet along a conveyance path, a skew-feed correction member positioned in the conveyance path such that a leading edge of the sheet conveyed by the conveyance portion contacts the skew-feed correction member to correct a skew-feed of the sheet, a receiving portion configured to receive information indicative of a width of the conveyed sheet, the width being in a direction orthogonal to a sheet conveyance direction, and a control portion configured to adjust a skew-correction conveyance amount of the conveyance portion applied to correct the skew-feed of the sheet by the skew-feed correction member. The skew-correction conveyance amount is adjusted on information which the receiving portion receives such that the skew-correction conveyance amount is set to be larger for a sheet of smaller width compared to a sheet of greater width. The present invention also includes an image forming apparatus that contains such sheet conveying apparatus.

According to the present invention, the skew-feed of the sheet can be corrected with reliability regardless of the size of the sheet in the width direction.

Further features of the present invention will become apparent from the following description of exemplary embodiments with reference to the attached drawings.

DESCRIPTION OF THE EMBODIMENTS

Figure 1:
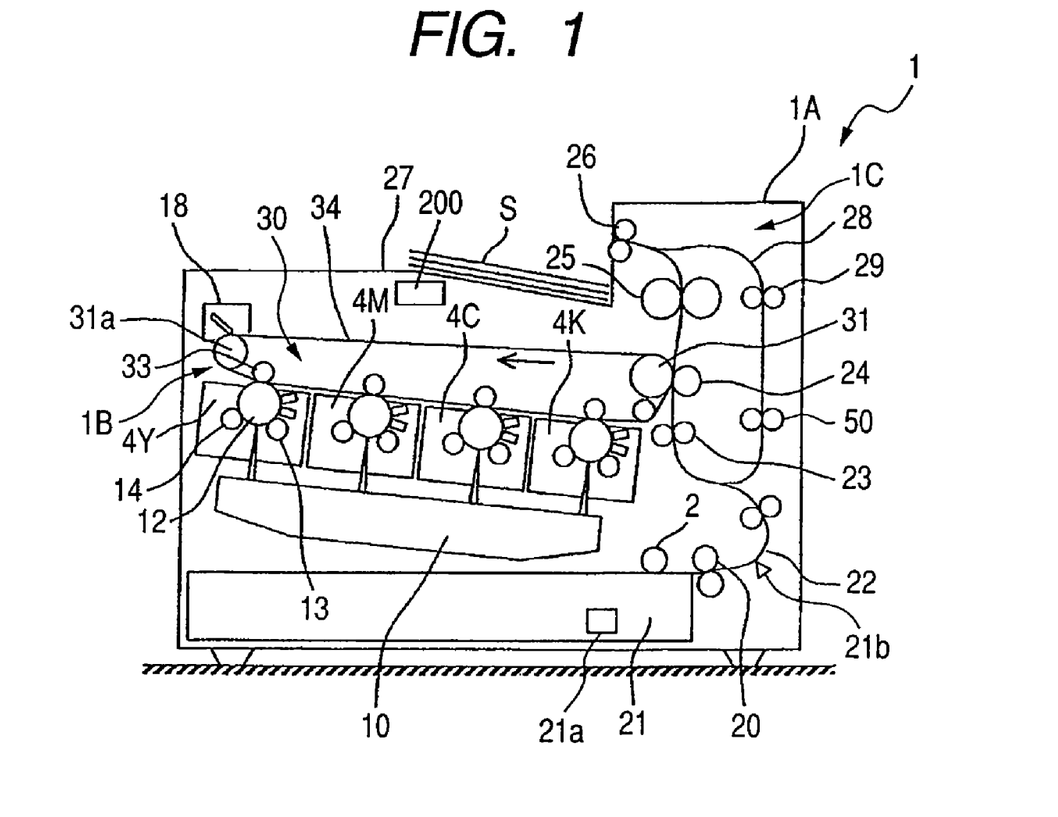
FIG. 1 is a view illustrating a configuration of an image forming apparatus (a printer) according to a first embodiment of the present invention.

Embodiments of the present invention are described below in detail with reference to the drawings. FIG. 1 is a view illustrating a configuration of a printer as an example of an image forming apparatus according to a first embodiment of the present invention. A printer 1 includes a printer main body 1A as an apparatus main body, an image forming portion 1B configured to form an image on a sheet, and a fixing portion 25. The printer 1 further includes a sheet feed cassette 21 as a sheet containing portion that is detachably mounted in the printer main body 1A and contains sheets, and a pickup roller 2 which feeds a sheet S contained in the sheet feed cassette 21 in response to a print signal.

The image forming portion 1B includes a scanner unit 10, and four process cartridges 4 (4Y, 4M, 4C, and 4Bk) forming toner images of four colors, which are yellow (Y), magenta (M), cyan (C), and black (Bk). The image forming portion 1B further includes an intermediate transfer unit 30 arranged above the process cartridges 4. Here, each of the process cartridges 4 includes a photosensitive drum 12, a charger 13, and a developing device 14. Both ends of the photosensitive drum 12 of each of the process cartridges 4 are rotatably supported by support members, and the photosensitive drum 12 is rotationally driven clockwise in such a manner that drive force from a drive motor (not shown) is transmitted to one of the ends thereof.

The intermediate transfer unit 30 includes an intermediate transfer belt 34 looped around a drive roller 31 and a tension roller 31a. The intermediate transfer unit 30 further includes primary transfer rollers 33, which are provided inside the intermediate transfer belt 34, and abut on the intermediate transfer belt 34 at positions opposite to the photosensitive drums 12. The printer 1 includes a cleaning portion 18 that cleans the intermediate transfer belt 34. Here, the intermediate transfer belt 34 comprises a film-like member, and is arranged so as to contact the photosensitive drums 12 of the respective process cartridges 4, and is rotated in an arrow direction by the drive roller 31 driven by a drive portion (not shown). Then, positive transfer biases are applied to the intermediate transfer belt 34 by the primary transfer rollers 33 so that the toner images of the respective colors, which have a negative polarity and are placed on the photosensitive drums, are sequentially transferred to the intermediate transfer belt 34 in a multi-layer manner. In such a way, a full-color image is formed on the intermediate transfer belt. At a position opposite to the drive roller 31 of the intermediate transfer unit 30, there is provided a secondary transfer roller 24 that configures a secondary transfer portion for transferring, to the sheets, the full-color image formed on the intermediate transfer belt.

Further, the fixing portion 25 is arranged above the secondary transfer roller 24, and a sheet discharge roller pair 26 and a two-side reversing portion 1C are arranged above the fixing portion 25. The two-side reversing portion 1C includes a duplex conveyance path 28 as a reconveyance path for reversing front and back surfaces of each sheet and guiding the sheet to the image forming portion 1B one more time in order to form the image on the back surface of the sheet, on the front surface of which the image has been formed by the image forming portion 1B. Then, on the duplex conveyance path 28, a skew-feed correction roller pair 29 that corrects a skew-feeding of the sheet S and a duplex conveyance roller pair 50 are sequentially arranged. A sheet conveying apparatus that conveys the sheet on which the image is formed comprises the sheet discharge roller pair 26, the two-side reversing portion 1C, and a registration roller pair 23 for conveying the sheets from the sheet feed cassette 21 to the image forming portion 1B. In FIG. 1, the printer 1 includes a reverse sensor 40 (see e.g. FIGS. 2A and 3A) that is provided downstream of the fixing portion 25 and detects passage of a trailing edge of a sheet S. The printer 1 further includes a controller 200 as a control portion that controls image forming operations of the printer 1, and controls reconveyance operations of the sheets S to the image forming portion 1B in the two-side reversing portion 1C, which are described later.

Next, the image forming operations of the printer 1 configured as described above will be described. When the image forming operations are started, first, based on image information from e.g. a personal computer (not shown), the scanner unit 10 projects laser beams (not shown) and sequentially exposes surfaces of the photosensitive drums in which the surfaces are uniformly charged with predetermined polarity/potential, to thereby form electrostatic latent images on the photosensitive drums. After that, the electrostatic latent images are developed by toner by using the developing devices 14, and are visualized. For example, first, a laser beam that is based on an image signal of a yellow component color is emitted from the scanner unit 10 onto the photosensitive drum 12 of the process cartridge 4Y of yellow, and an electrostatic latent image of yellow is formed on the photosensitive drum 12. Then, the electrostatic latent image of yellow is developed by yellow toner coming from the developing device 14a, and is visualized as a yellow toner image.

Next, when the yellow toner image reaches a primary transfer portion, in which the photosensitive drum 12 and the intermediate transfer belt 34 abut on each other, with the rotation of the photosensitive drum 12, the toner image on the photosensitive drum is transferred to the intermediate transfer belt 34 by such a primary transfer bias applied to the primary transfer roller 33. Next, when such a portion of the intermediate transfer belt 34, on which the yellow toner image is carried, moves, a magenta toner image formed on the photosensitive drum of the process cartridge 4M of magenta by the same method as the above until this time is transferred onto the yellow toner image on the intermediate transfer belt 34. In a similar way, as the intermediate transfer belt 34 moves, a cyan toner image and a black toner image are transferred onto the yellow toner image and the magenta toner image so as to be superimposed thereon in the primary transfer portions. In such a way, the full-color toner image is formed on the intermediate transfer belt 34.

Further, simultaneously with the toner image forming operations described above, the sheets S contained in the sheet feed cassette 21 are fed out by the pickup roller 2. After that, the sheets S are separated one by one by a retard roller pair 20 that configures a separating portion, and each of the sheets S passes through a conveyance path 22 and is conveyed to the registration roller pair 23. Next, when a leading edge of the sheet S is detected by a registration sensor (not shown) located downstream of the registration roller pair 23 in a sheet conveyance direction, the registration roller pair 23 is driven so that the leading edge of the sheet S and the full-color toner image on the intermediate transfer belt can be aligned with each other in the secondary transfer portion. In such a way, the sheet S is conveyed to the secondary transfer portion, and in the secondary transfer portion, the full-color toner image is transferred in a lump onto the sheet S by a secondary transfer bias applied to the secondary transfer roller 24. Extra toner that has remained on the intermediate transfer belt 34 is cleaned by such an intermediate transfer belt cleaner 18, and the intermediate transfer belt 34 is ready for the next image forming process.

Next, the sheet S to which the full-color toner image is transferred as described above is conveyed to the fixing portion 25, and in the fixing portion 25, the toners of the respective colors are fused and mixed with one another by receiving heat and pressure, and are fixed as the full-color image on the sheet S. After that, in the case of one-sided printing, the sheet S on which the image is fixed is discharged onto a sheet discharge tray 27 while facing the printed surface thereof downward by the sheet discharge roller pair 26. The sheet discharge roller pair 26 as an example of a conveyance portion conveys the sheet S to an outside of the printer main body by forward rotation of the sheet discharge roller pair 26, and conveys the sheet on one surface of which the image is formed to the duplex conveyance path 28 by reverse rotation of the sheet discharge roller pair 26.

Hence, in the case of forming the images on both surfaces of the sheet S, after a part of the sheet S is discharged once in a direction toward the sheet discharge tray 27 by the sheet discharge roller pair 26, the sheet discharge roller pair 26 is reversely rotated. In such a way, the sheet S is conveyed to the duplex conveyance path 28 for second surface printing. Then, when the sheet S is passing through the duplex conveyance path 28, a skew-feed thereof is corrected by the skew-feed correction roller pair 29, and after that, the sheet S is conveyed again to the image forming portion 1B by the duplex conveyance roller pair 50 and the registration roller pair 23, and the image is formed on the second surface of the sheet S.

In terms of function, the sheet discharge roller pair 26 is designed paying much attention to stacking regularity of the sheets on the sheet discharge tray 27, and to reduction of image quality damage on the image surfaces. Accordingly, the sheet discharge roller pair 26 ds designed so that conveying force thereof can become small.

Figure 5A:
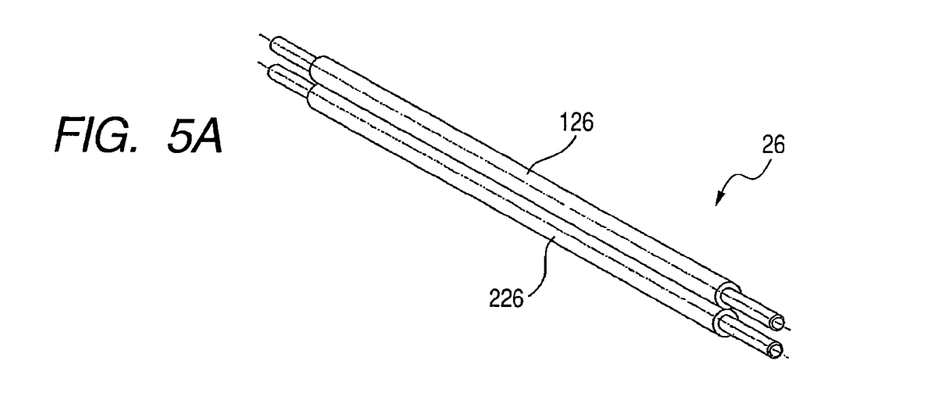
FIGS. 5A and 5B are views illustrating configurations of sheet discharge rollers.

A roller pair of a through roller type as illustrated in FIG. 5A is used as the sheet discharge roller pair 26 of this embodiment. The roller pair of the through roller type is a roller pair including through rollers 126 and 226 in which outer circumferences continuously contact the sheet in a width direction. The sheet discharge roller pair 26 conveys the sheet soon after the sheet passes through the fixing portion 25. Hence, because the sheet discharge roller pair 26 is formed into the through roller type, the sheet discharge rollers continuously contact the sheet in the width direction, and accordingly, unevenness is prevented from occurring in the image on the sheet.

Figure 6:
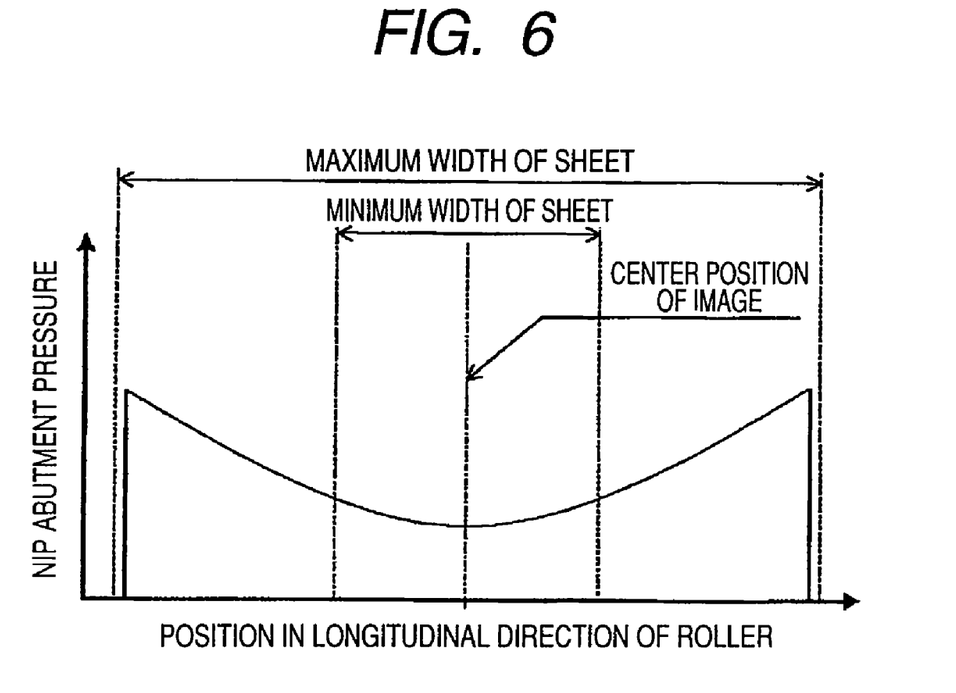
FIG. 6 is a graph illustrating a distribution of a nip abutment pressure of a sheet discharge roller of a through roller type.

In the sheet discharge roller pair 26, the pair of through rollers 126 and 226 are pressurized at both ends thereof. Hence, the through rollers 126 and 226 are prone to be deflected, and when the deflection occurs, nonuniformity occurs in an axial pressure distribution in the rollers 126 and 226. In the pressure distribution in this case, as illustrated in FIG. 6, a pressure at center portions of the through rollers in the width direction becomes small. Then, when the pressure becomes small at the center portions as described above, because a sheet having a narrow width passes through the center portion of the sheet discharge roller pair 26 in the case of conveying the sheet concerned, the sheet conveying force becomes significantly weak as compared with the case of conveying a sheet having a wide width.

Moreover, in this embodiment, the sheet that is being conveyed is nipped simultaneously by the fixing portion 25 and the sheet discharge roller pair 26. Further, a conveying speed of the sheet discharge roller pair 26 is set faster than that of the fixing portion 25 so that the sheet cannot sag between the fixing portion 25 and the sheet discharge roller pair 26. Therefore, the sheet discharge roller pair 26 is used at a light pressure so as not to damage the image on the sheet. Owing to circumstances as described above, when the pressure at the center portion of the sheet discharge roller pair 26 becomes small, the sheet conveying force in the case of conveying such a narrow sheet becomes small, and it is difficult to stably convey the narrow sheet.

Figure 5B:
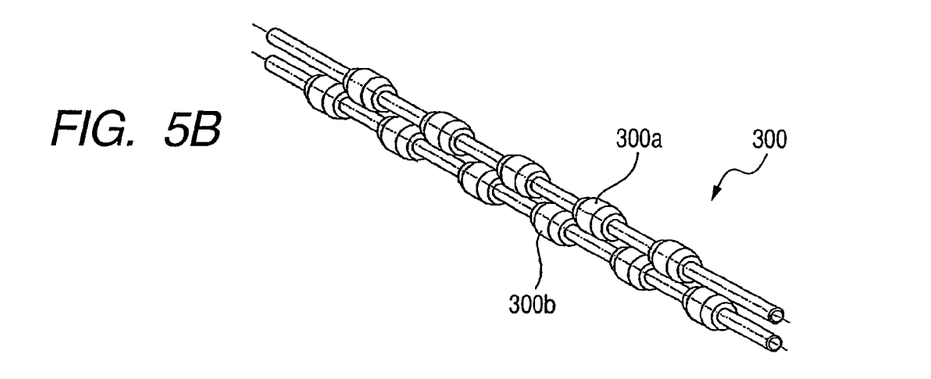

A roller pair 300 of a divided roller type (in the shape of comb teeth), which is as illustrated in FIG. 5B, may be used as the sheet discharge roller pair 26. The roller pair of the divided roller type is a roller pair in which rollers of divided rollers 300a and 300b disposed opposite to each other are alternated as illustrated in FIG. 5B. The roller pair 300 has a configuration in which the conveying force is obtained not by nipping the sheet by the divided rollers 300a and 300b but by using the strength in stiffness of a sheet. Therefore, in terms of principle, it is difficult to obtain large conveying force. As the width of the sheet becomes smaller, abutting portions of the sheet on the divided rollers 300a and 300b are reduced, and accordingly, the sheet conveying force is decreased. When the sheet is discharged by the divided rollers 300a and 300b, the sheet is discharged in a waving (or undulating) state. Hence, the leading edge of the sheet that is being discharged is prevented from contacting the sheets already stacked on the sheet discharge tray 27, and therefore, the stacking regularity of the sheets on the sheet discharge tray 27 is improved.

As described above, in particular, in the case of conveying the sheet by the sheet discharge roller pair of the through roller type or the divided roller type, conveyance stability of the sheet is decreased as the width of the sheet becomes smaller. As a result, an amount of skew-feed of the sheet, which may occur while the sheet discharge roller pair 26 conveys the sheet, is increased as a width size of the sheet (that is, a length of the sheet in a direction orthogonal to the conveyance direction of the sheet) becomes smaller. Moreover, conveyance efficiency of when the sheet discharge roller pair 26 conveys the sheet is decreased as the width size of the sheet becomes smaller. Here, it is illustrated that the roller pair of the through roller type or the divided roller type is used as the sheet discharge roller pair. However, even in the case of using a roller pair that has outer circumferences discontinuously contacting the sheet in the width direction and conveys the sheet while nipping the sheet therebetween, a contact portion thereof with the sheet is reduced as the size of the sheet in the width direction becomes smaller, and accordingly, conveying force thereof becomes small.

In order that a loop can be formed in the sheet, the leading edge of the sheet strikes (contacts) the skew-feed correction roller pair 29 by the sheet discharge roller pair 26, and the skew-feed of the sheet is thereby corrected. Here, in the case where the sheet discharge roller pair 26 conveys a narrow sheet, the skew-feed amount thereof is increased (with respect to a wider sheet). Accordingly, the skew-feed correction may not be performed sufficiently because the skew-feed correction roller pair 29 starts to rotate before the leading edge of the sheet is aligned with the skew-feed correction roller pair 29. Meanwhile, if timing when the skew-feed correction roller pair starts to rotate is set to be delayed so that the leading edge of the narrow sheet can be sufficiently aligned with the skew-feed correction roller pair, there arise problems as follows. Specifically, when the wide sheet is conveyed, an amount by which the sheet discharge roller pair 26 feeds the wide sheet after the leading edge thereof strikes the skew-feed correction roller pair 29 is increased, and accordingly, an excessive loop is formed in the sheet between the sheet discharge roller pair 26 and the skew-feed correction roller pair 29. Then, the loop thus formed excessively contacts a conveying guide, and the sheet is buckled, and in addition, noise occurs following such buckling.

Further, the conveyance efficiency of the sheet discharge roller pair 26 differs depending on the width size of the sheet to be conveyed. Accordingly, depending on the width size of the sheet, a difference in time occurs from a time when the sheet is detected by the sensor to a time when the sheet reaches the skew-feed correction roller pair 29. Therefore, if the conveyance control is performed so that an appropriate loop can be formed in the wide sheet, in the narrow sheet, a lack of the loop occurs, and a sufficient skew-feed correction effect cannot be obtained. On the contrary, if the conveyance control is performed so that an appropriate loop can be formed in the narrow sheet, in the wide sheet, the loop becomes too large, resulting in the occurrence of the buckling of the sheet and the occurrence of the noise following the buckling.

As described above, depending on the difference in the width size of the sheet, the problems occur, as identified by the applicant, that the sufficient skew-feed correction effect cannot be obtained, and that the sheet is buckled at the time of the skew-feed correction. In order to deal with those problems, in this embodiment, there is performed control to increase a skew-correction conveyance amount, by which the sheet discharge roller pair 26 conveys for the purpose of the skew-feed correction, as the length of the sheet S in the width direction orthogonal to the sheet conveyance direction becomes smaller. So, in the present embodiment, the skew-correction conveyance amount is an amount by which the sheet discharge roller pair 26 rotates during a time period starting from the detection of the sheet by the sensor to an end of the operation of the skew-correction. In the present embodiment, the end of the operation of the skew-correction is determined by the time when the skew-feed correction roller pair 29 starts rotating. This may be expressed, for example, in terms of the circumference of the roller multiplied by the number of rotations of the roller pair. Such operations for the sheet conveyance by the sheet discharge roller pair 26 and the skew-feed correction using the skew-feed correction roller pair 29 will be described below in detail.

Figure 2A:
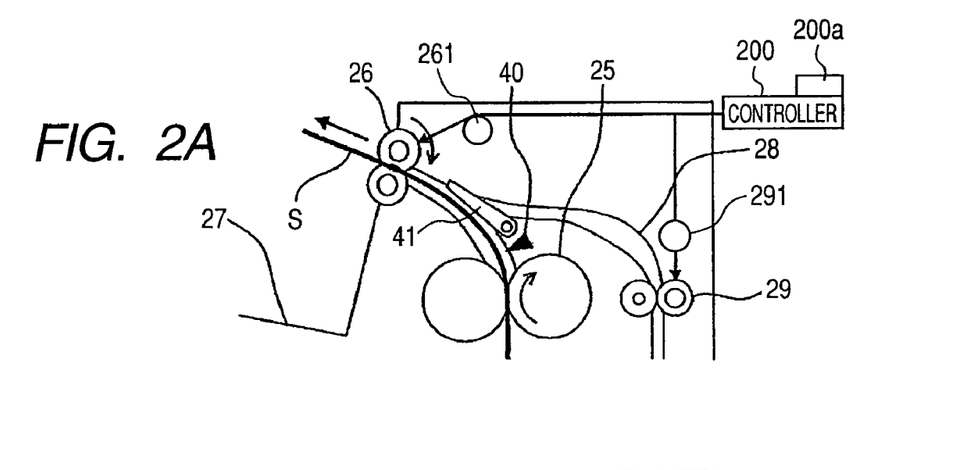
FIGS. 2A, 2B, and 2C are views illustrating operations of the printer of FIG. 1 at a time of two-sided printing.

As illustrated in FIG. 2A, the operations of the sheet discharge roller pair 26 and the skew-feed correction roller pair 29 are controlled by the controller 200. The controller 200 controls drive of a sheet discharge roller drive motor 261 that drives the sheet discharge roller pair 26, to thereby control the operations of the sheet discharge roller pair 26. The controller 200 controls drive of a skew-feed correction roller drive motor 291 that drives the skew-feed correction roller pair 29, to thereby control the operations of the skew-feed correction roller pair 29.

Figure 2B:
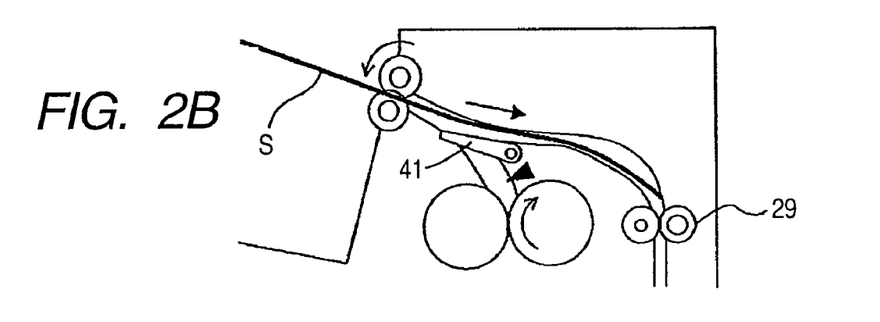
Figure 2C:
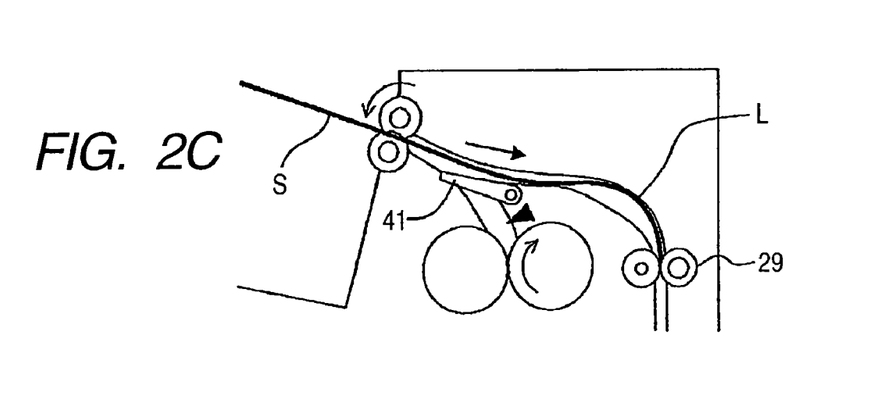

As illustrated in FIGS. 2A to 2C, a switching member 41 is provided between the fixing portion 25 and the sheet discharge roller pair 26. The switching member 41 guides the sheet S, which is reversed by the sheet discharge roller pair 26, to the duplex conveyance path 28 at the time of the two-sided printing. In the case of the one-sided printing, as illustrated in FIG. 2A, the sheet S to which the image is fixed is discharged by the sheet discharge roller pair 26 onto the sheet discharge tray 27 while being guided by the switching member 41 and facing the printing surface thereof downward. Meanwhile, in the case of forming the images on both surfaces of the sheet S, after the trailing edge of the sheet S passes through the fixing portion 25, the reverse sensor 40 provided between the fixing portion 25 and the sheet discharge roller pair 26 detects the passage of the trailing edge of the sheet S. Here, the controller 200 drives the sheet discharge roller drive motor 261 so as to switch the drive of the sheet discharge roller pair 26 from the forward rotation direction to the reverse rotation direction after the elapse of a predetermined time from such a timing of detecting the trailing edge. Further, the controller 200 rotates the switching member 41 counterclockwise from a position thereof illustrated in FIG. 2A by a drive mechanism (not shown) such as a solenoid. In such a way, when the sheet discharge roller pair 26 is reversed after a part of the sheet S is discharged once in the direction toward the sheet discharge tray 27, that is, to the outside of the apparatus body, the sheet S passes on an upper surface of the switching member 41 and is conveyed toward the duplex conveyance path 28 as illustrated in FIG. 2B.

Then, when the sheet S passes through the duplex conveyance path 28, the skew-feed of the sheet S is corrected by the skew-feed correction roller pair 29 as skew-feed correction member on which (against which) the sheet S is struck to correct the skew-feed of the sheet concerned. Here, in this embodiment, the drives of the sheet discharge roller pair 26 and the skew-feed correction roller pair 29 are controlled independently of each other. Accordingly, when the sheet S is conveyed to the duplex conveyance path 28 by the reverse rotation of the sheet discharge roller pair 26, the skew-feed correction roller pair 29 is on standby in a state of stopping the rotation thereof (so in a stopped, i.e. non-rotating, state). Further, the skew-feed correction roller pair 29 as skew-feed correction roller member is arranged at a position where a distance thereof to the sheet discharge roller pair 26 is shorter than the length of the sheet in the sheet conveyance direction.

As described above, the skew-feed correction roller pair 29 is on standby in such a rotation stopped state as a skew-feed correction state for correcting the skew-feed of the sheet, with the result that the leading edge of the sheet S conveyed thereto is retained by a nip of the skew-feed correction roller pair 29 as illustrated in FIG. 2C. However, also in this period, the sheet discharge roller pair 26 continues to feed the sheet S to the duplex conveyance path 28, and accordingly, the sheet S forms a loop (deflection) L between the sheet discharge roller pair 26 and the skew-feed correction roller pair 29. Then, in association of the formation of the loop L, an attitude of the leading edge of the sheet is aligned so as to be parallel to an axial direction of the skew-feed correction roller pair 29 (so the skew is corrected). Next, at the point of time when a time set in accordance with the width size of the sheet as described later has passed from the timing when the trailing edge of the sheet was detected by the reverse sensor 40, the drive of the skew-feed correction roller pair 29 is started. When the drive of the skew-feed correction roller pair 29 is started, the skew-feed correction roller pair 29 starts to rotate in a rotation state (conveyance-allowed state) that allows the conveyance of the sheet, having already corrected its skew-feed by the leading edge of the sheet striking the skew-feed correction roller pair 29. Then, the sheet S is conveyed again toward the image forming portion 1B by the skew-feed correction roller pair 29.

Here, as already described, as the width size of the sheet becomes smaller, the sheet conveying force of the sheet discharge roller pair 26 is decreased, and both of the conveyance stability and conveyance efficiency thereof tend to be decreased. Therefore, in order to surely correct the skew-feed of the sheet, it is preferable to switch (adjust) a standby time from the trailing edge detection timing by the reverse sensor 40 to the drive start of the skew-feed correction roller pair 29 (hereinafter, the standby time is referred to as a loop control time) in accordance with the width size of the sheet that is being conveyed.

Accordingly, in this embodiment, based on size information of the sheet set in the sheet feed cassette 21, the controller 200 recognizes the width size of the sheet that is being conveyed, and switches or adjusts the loop control time in accordance with the recognized width size of the sheet. For example, the controller 200 controls the loop control time to be switched step by step in three steps, which are: the case where the sheet width is equal to or smaller than that (148 mm) (5.82677 in) of JIS A5R; the case where the sheet width is larger than that of JIS A5R and equal to or smaller than that (216 mm) (8.50394 in) of LTR-R; and the case where the sheet width is larger than that of LTR-R. More specifically, in the case where the sheet width is equal to or smaller than that (148 mm) (5.82677 in) of JIS A5R, the loop control time is set longer than in the case where the sheet width is larger than that of JIS A5R and equal to or smaller than that (216 mm) (8.50394 in) of LTR-R. Further, in the case where the sheet width is larger than that of JIS A5R and equal to or smaller than that (216 mm) (8.50394) of LTR-R, the loop control time is set longer than in the case where the sheet width is larger than that of LTR-R.

The loop control time is changed as described above, with the result that a skew-correction conveyance amount by which the sheet discharge roller pair 26 conveys the sheet (that is, a rotation amount of the sheet discharge roller pair 26) for the skew-feed correction by the skew-feed correction roller pair 29 (after the reverse sensor 40 as a detection portion detects the sheet) is increased as the length of the sheet in the width direction orthogonal to the sheet conveyance direction is shorter. Then, the loop control time in accordance with the width size of the sheet is set as described above, to thereby align the attitude of the sheet so that the leading edge can be parallel to the axial direction of the skew-feed correction roller pair 29. Accordingly, the skew-feed of the sheet can be corrected appropriately and surely.

For such setting of the loop control time, a longer loop control time is ensured as the width size of the sheet becomes smaller. However, it is further preferable to optimize classification among the width sizes and an absolute value of the loop control time for each type of sheet (so for different mediums). In other words, the loop control time is preferably set in accordance with a combination of the width size of the sheet and the type of the sheet. Next, as a setting method for the loop control time, an example of setting the loop control time in accordance with a combination of the width size of the sheet and basis weight of the sheet will be described. Stiffness of a sheet having light basis weight is weak, and accordingly, as the basis weight becomes smaller, as described above, the conveying force of the sheet discharge roller pair 26 is decreased, and both of the conveyance stability and the conveyance efficiency tend to be decreased. Further, a difference in conveyance stability/conveyance efficiency, which depends on the width size, becomes significant in the sheet having the light basis weight, whereas, in the sheet having heavy basis weight, sufficient conveying force can be obtained because stiffness thereof is strong, and such a difference as described above becomes slight. In consideration of those tendencies, as the basis weight of the sheet becomes smaller, a longer loop control time is ensured, and a difference in loop control time among the width sizes is set larger. On the contrary, as the basis weight of the sheet is larger, the loop control time is made shorter, and the difference in loop control time among the width sizes is set smaller, or no difference is set.

Figure 9:
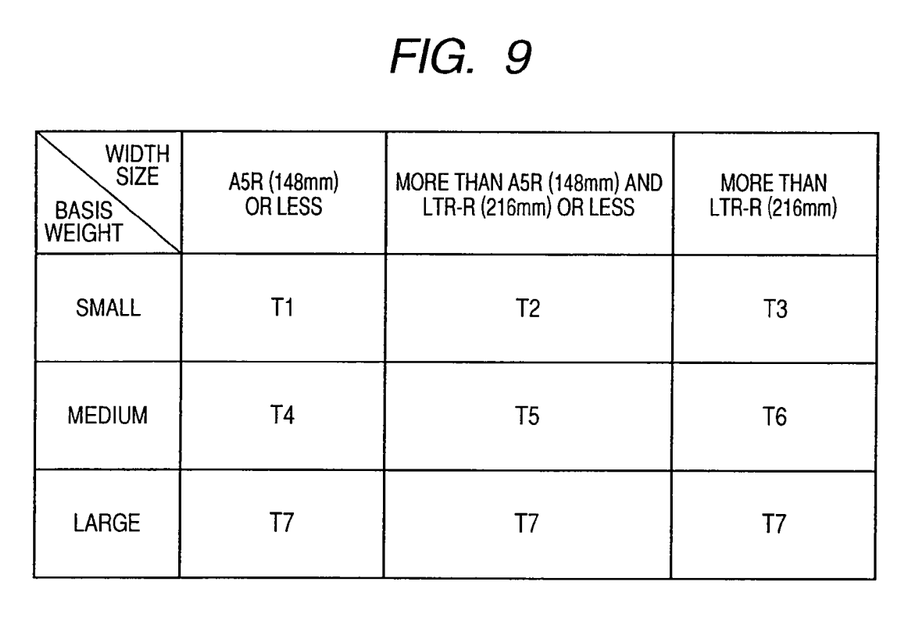
FIG. 9 is a table illustrating relationships among each loop control time and a width size and a basis weight of each sheet.

FIG. 9 is a table in which the above-mentioned examples of the relationships among the basis weights and width sizes of the sheets and the loop control time are summarized. A loop control time T1 in the case of the sheet in which the width size is equal to or smaller than that of JIS A5R and the basis weight is small is longer than a loop control time T2 in the case of the sheet in which the width size is larger than that of JIS A5R and equal to or smaller than that of LTR-R and the basis weight is small. The loop control time T2 in the case of the sheet in which the width size is larger than that of JIS A5R and equal to or smaller than that of LTR-R and the basis weight is small is longer than a loop control time T3 in the case of the sheet in which the width size is larger than that of LTR-R and the basis weight is small. The sheet of which the basis weight is small is a sheet, for example, having basis weight equal to or smaller than 70 g/m$^2$ (0.229396 oz/ft$^2$).

Further, a loop control time T4 in the case of the sheet in which the width size is equal to or smaller than that of JIS A5R and the basis weight is middle is longer than a loop control time T5 in the case of the sheet in which the width size is larger than that of JIS A5R and equal to or smaller than that of LTR-R and the basis weight is middle. The loop control time T5 in the case of the sheet in which the width size is larger than that of JIS A5R and equal to or smaller than that of LTR-R and the basis weight is middle is longer than a loop control time T6 in the case of the sheet in which the width size is larger than that of LTR-R and the basis weight is middle. The sheet of which the basis weight is middle is, for example, a sheet having basis weight larger than 70 g/m$^2$ (0.229396 oz/ft$^2$) and equal to or smaller than 150 g/m$^2$ (0.491559 oz/ft$^2$). As illustrated in FIG. 9, as the width size becomes smaller, the loop control time is set longer.

Further, as the basis weight becomes smaller, the loop control time is set longer. Specifically, the loop control time is set as T1>T4>T7, T2>T5>T7, and T3>T6>T7. Moreover, as described above, as the basis weight of the sheet becomes smaller, the difference in loop control time among the width sizes is set larger. Specifically, the loop control time is set as T1-T2>T4-T5, and T2-T3>T5-T6. In the case of thick paper in which the basis weight is large, that is, exceeds 150 g/m$^2$ (0.491559 oz/ft$^2$), the loop control time is set uniformly at the loop control time T7.

A signal (information) from a size detection sensor 21a in accordance with the width size of the sheet to be conveyed is input in an input portion 200a. The size detection sensor 21a detects, for example, a position of a side regulation plate that is movable in the width direction and is provided for regulating the width direction of the sheet in the sheet feed cassette 21. The width size of the sheet to be conveyed is determined by the controller 200 based on a signal input in the input portion 200a from the size detection sensor 21a. Further, a signal (information) from a media sensor 21b according to the basis weight of the conveyed sheet is input in the input portion 200a. The media sensor 21b can measure the basis weight of the conveyed sheet and is provided in the conveyance path 22. The basis weight of the sheet is determined by the controller 200 based on the signal input in the input portion 200a from the media sensor 21b. As above mentioned the input portion 200a, as a receiving portion, receives information from the size detection sensor 21a and the media sensor 21b. As an example, a mode has been described, in which the controller recognizes the width size and basis weight of the sheet based on the signals from the respective sensors. However, for example, a configuration may be adopted, in which the controller 200 recognizes the size and basis weight of the sheet in the following manner. Specifically, a user sets the size and basis weight of the sheet on an operation panel. Information regarding setting contents thereof is input to the input portion 200a. The controller 200 recognizes the width size and basis weight of the sheet based on the information input in the input portion 200a from the operation panel.

Figure 7:
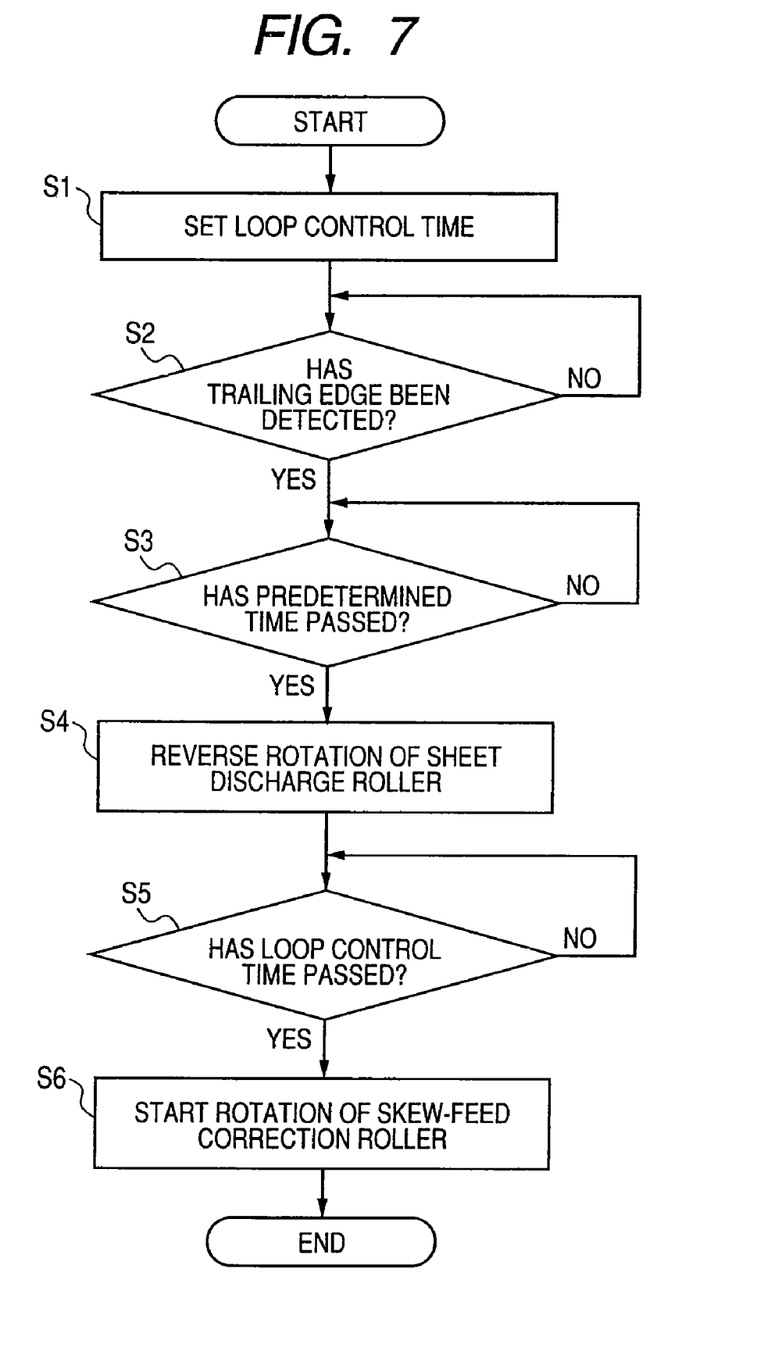
FIG. 7 is a flowchart of skew-feed correcting operations.

Now, operations related to the above-mentioned skew-feed correction will be described with reference to a flowchart of FIG. 7.

The controller 200 sets the loop control time in accordance with the basis weight and width size of the sheet to be conveyed with reference to the table of FIG. 9 (S1). The controller 200 determines whether or not a signal indicating that the trailing edge of the sheet S to be conveyed in the direction (first direction) toward the sheet discharge tray 27 by the sheet discharge roller pair 26 has passed through the reverse sensor 40 is received from the reverse sensor 40 (S2). When the signal indicating that the trailing edge of the sheet S has passed through the reverse sensor 40 is input to the controller 200, and the controller 200 has detected the trailing edge of the sheet (YES in S2), the operations proceed to S3. In S3, the controller 200 determines whether or not a predetermined time has passed since the signal from the reverse sensor 40 was received (S3). When the predetermined time has passed (YES in S3), the controller 200 controls the sheet discharge roller drive motor 261 to reversely rotate the sheet discharge roller pair 26 (S4). The sheet discharge roller pair 26 rotates reversely, and hence the sheet is conveyed in the direction (second direction) toward the duplex conveyance path 28 (refer to FIG. 2B). The leading edge of the sheet conveyed to the duplex conveyance path 28 by the reverse rotation of the sheet discharge roller pair 26 strikes the skew-feed correction roller pair 29 that has been stopped (refer to FIG. 2C). The controller 200 determines whether or not the loop control time set in accordance with the width size and the basis weight in S1 has passed since the signal indicating that the trailing edge of the conveyed sheet S has passed through the reverse sensor 40 was received from the reverse sensor 40 (S5). When the loop control time has passed (YES in S5), the controller 200 controls the skew-feed correction roller drive motor 291 to start the rotation of the skew-feed correction roller pair 29 (S6). The sheet, having already had its skew-feed corrected by the time that the skew-feed correction roller pair 29 starts to rotate, is conveyed by the skew-feed correction roller pair 29.

Here, it has been described that the loop control time is set based on the combination of the width size and the basis weight. However, in the case of coated paper or a special sheet such as an OHT sheet (or OHP transparent sheet), a difference occurs in conveying characteristics of the sheet discharge roller pair 26 compared to the case of plain sheet (sheet that is not special) owing to the above-mentioned reasons. Hence, it is preferable to individually set the optimum loop control time also for such a special sheet based on the sheet-type.

As described above, in this embodiment, the time from a time when the sheet discharge roller pair 26 starts to rotate reversely to a time when the skew-feed correction roller pair 29 is switched to the conveyance-allowed state is increased as the length of the sheet S in the width direction orthogonal to the sheet conveyance direction becomes smaller. In other words, in this embodiment, for the purpose of the skew-feed correction by the skew-feed correction roller pair 29, the skew-correction conveyance amount (rotation amount) by which the sheet discharge roller pair 26 conveys the sheet is increased as the length of the sheet S in the width direction orthogonal to the sheet conveyance direction becomes smaller. In such a way, the skew-feed of the sheet can be surely corrected regardless of the length of the sheet in the width direction. In other words, in this embodiment, the skew-feed correction control in accordance with the width size of the sheet can be applied in consideration of the difference in conveying characteristics of the sheet discharge roller pair 26, which is caused by the difference among the width sizes of the sheet. In such a way, the sufficient skew-feed correction effect can be obtained for the various width sizes of sheets, and good printing accuracy is realized also for the second surface in the case of the two-sided printing. Moreover, improvement of printing quality of the printer and miniaturization/cost reduction thereof can also be made mutually compatible. Instead of adjusting the time period, between the time when the sheet discharge roller pair 26 starts to rotate reversely and the time when the skew-feed correction roller pair 29 is switched to the conveyance-allowed state, the rotation speed of the sheet discharge roller pair may be adjusted to increase the skew-correction conveyance amount as the width decreases.

Figure 3A:
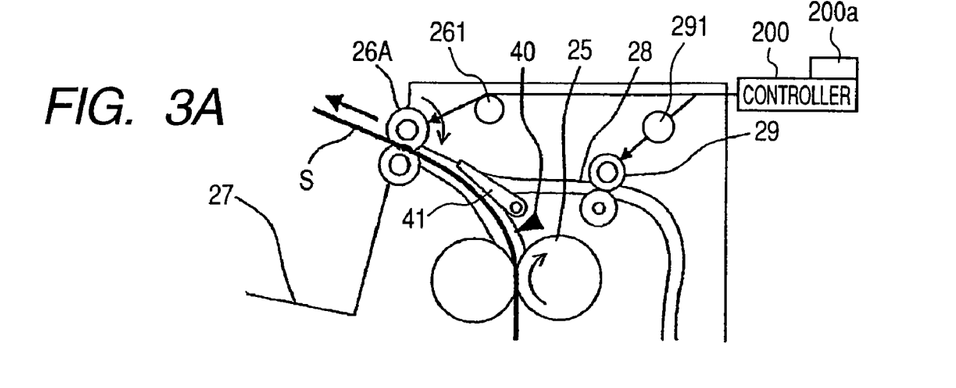
FIGS. 3A, 3B, and 3C are enlarged views of a principal portion of a printer according to a second embodiment of the present invention.
Figure 3B:
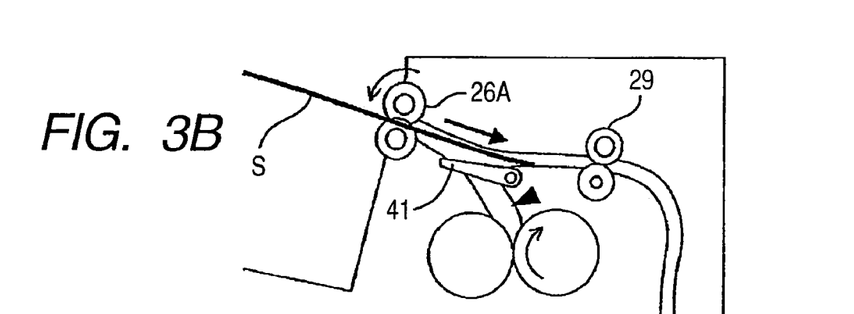
Figure 3C:
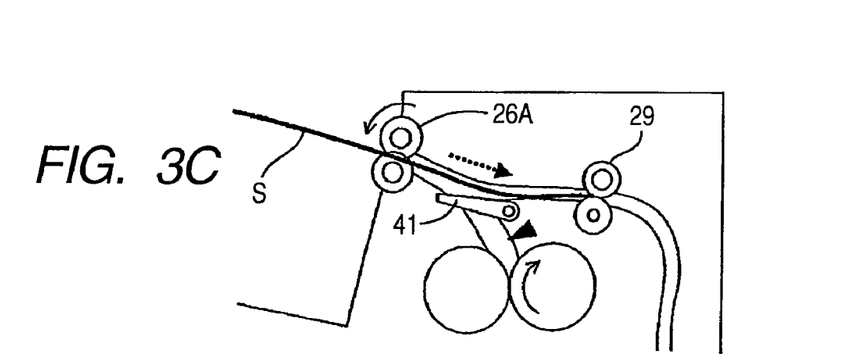

Incidentally, the description has been made so far of the skew-feed correction method of correcting the skew-feed by forming a loop in the sheet of which the leading edge strikes the skew-feed correction roller pair 29. However, the present invention is not limited to this. For example, the present invention can also be applied to a method of correcting the skew-feed of the sheet in such a manner that the sheet conveying force of the sheet discharge roller pair is reduced to allow the sheet discharge roller pair to function as slip rollers without forming the loop on the sheet (or in a state where the loop formed in the sheet is suppressed to be small). Next, a second embodiment of the present invention will be described, in which the skew-feed of the sheet is corrected without forming the loop in the sheet as described above. FIGS. 3A to 3C are enlarged views of a principal portion of a printer according to this embodiment. In FIGS. 3A to 3C, the same reference numerals as those already listed in FIGS. 2A to 2C denote the same or equivalent portions.

In FIGS. 3A to 3C, the printer includes a sheet discharge roller pair 26A of the above-mentioned divided roller type, which is similar to that illustrated in FIG. 5B, and in particular in this embodiment the sheet discharge roller pair 26A is formed of foamed silicon rubber with low density. Further, with regard to a support method for the sheet discharge roller pair 26A, there is adopted a configuration in which an inter-axis distance of the rollers is changeable in accordance with the stiffness of the sheet that is being conveyed, and in addition, pressing force of the sheet discharge roller pair 26A is set at a minimum pressure at which the stacking regularity and conveyance stability of the sheets to the sheet discharge tray 27 can be ensured. In such a way, the sheet conveying force of the sheet discharge roller pair 26A for all types of the sheets is suppressed to be low, and in the case of receiving conveyance resistance of a predetermined magnitude or more, the sheet discharge roller pair 26A and the sheet are made more amenable to slip on each other so as to reduce the damage given to the sheet by the sheet discharge roller pair 26A and to reduce abrasion of the sheet discharge rollers themselves.

In the printer including the sheet discharge roller pair 26A as described above, in the case of the two-sided printing, when the sheet S of which the front surface is the first surface in the two-sided printing passes through the fixing portion 25, the sheet discharge roller pair 26A rotates in the forward rotation direction, and conveys the sheet S in the discharge direction as illustrated in FIG. 3A. After a while, when the trailing edge of the sheet S finishes passing through the fixing portion 25, the reverse sensor 40 detects the passage of the trailing edge of the sheet S. Then, after elapse of a predetermined time from the timing of detecting the trailing edge, the controller 200 switches the drive of the sheet discharge roller pair 26A from the forward rotation direction to the reverse rotation direction. In association with the switching, the conveyance direction of the sheet S is reversed, and as illustrated in FIG. 3B, the sheet S is conveyed toward the duplex conveyance path 28.

Next, the leading edge of the sheet S fed into the duplex conveyance path 28 by the sheet discharge roller pair 26A then strikes the nip of the skew-feed correction roller pair 29, which has been stopped driving, as illustrated in FIG. 3C. In this embodiment, the conveyance path from the sheet discharge roller pair 26A to the skew-feed correction roller pair 29 is constructed in such a manner that a relatively straight path is formed in a narrow inter-guide gap so that the deflection can be made less likely to occur in the striking sheet. Therefore, in the sheet S striking the skew-feed correction roller pair 29, large conveyance resistance is generated. Here, as already described, the sheet conveying force of the sheet discharge roller pair 26A of the divided roller type is suppressed to be low. Therefore, when the conveyance resistance acts on the sheet S, the sheet discharge roller pair 26A slips with respect to the sheet S. Consequently, at this time, on the sheet S, there acts force to rotate the sheet S concerned to an attitude in which a balance between the conveying force and the conveyance resistance is stabilized most, that is, to a state where the axial direction of the skew-feed correction roller pair 29 and the leading edge of the sheet become parallel to each other. Therefore, in accordance with the slippage of the sheet discharge roller pair 26, the entire sheet skews until the leading edge is parallel with the axial direction of the skew-feed correction roller pair, and the skew-feed correction is thereby performed. In addition, as the width size of the sheet becomes smaller, the conveying force of the sheet discharge roller pair 26 becomes smaller, and accordingly, the sheet discharge roller pair 26 and the narrow sheet are made more amenable to slip on each other.

Also in such a skew-feed correction method, if a time difference occurs, depending on the width size of the sheet, from a time when the sheet S passes through the reverse sensor 40 to a time when the sheet S strikes the skew-feed correction roller pair 29, the sufficient skew-feed correction cannot be performed, and the sheet S that is being conveyed and the image on the sheet concerned may be damaged. Accordingly, in this embodiment, an amount of time from a time when the trailing edge of the sheet is detected by the reverse sensor 40 to a time when the drive of the skew-feed correction roller pair 29 is started (hereinafter, this amount of time is referred to as a slippage control time) is switched or adjusted in accordance with the width size of the sheet that is being conveyed. Therefore, also in this embodiment, based on the information from the size detection sensor 21a that detects the size of the sheet contained in the sheet feed cassette 21, the controller 200 recognizes the width size of the sheet to be conveyed, and switches or adjusts the slippage control time in accordance with the recognized width size of the sheet. For example, the controller 200 switches the slippage control time in two steps so that, in the case where the sheet width is equal to or smaller than that (148 mm) (5.82677 in) of JIS A5R, the slippage control time can be longer than in the case where the width size exceeds 148 mm (5.82677 in). Moreover, the slippage control time may be set in accordance with the time categories in the table illustrated in FIG. 9.

Then, the slippage control time is switched in accordance with the width size of the sheet as described above, and hence the attitude of the sheet is aligned so that the leading edge thereof can be parallel to the axial direction of the skew-feed correction roller pair 29 regardless of the width of the sheet. Accordingly, the skew-feed of the sheet can be surely corrected. For such setting of the slippage control time, a longer slippage control time is ensured as the width size of the sheet becomes smaller. However, it is further preferable to optimize the classification among the width sizes and an absolute value of the slippage control time for each type of the sheets (mediums). In other words, the slippage control time is preferably set in accordance with the combination of the width of the sheet and the type of the sheet.

Figure 8:
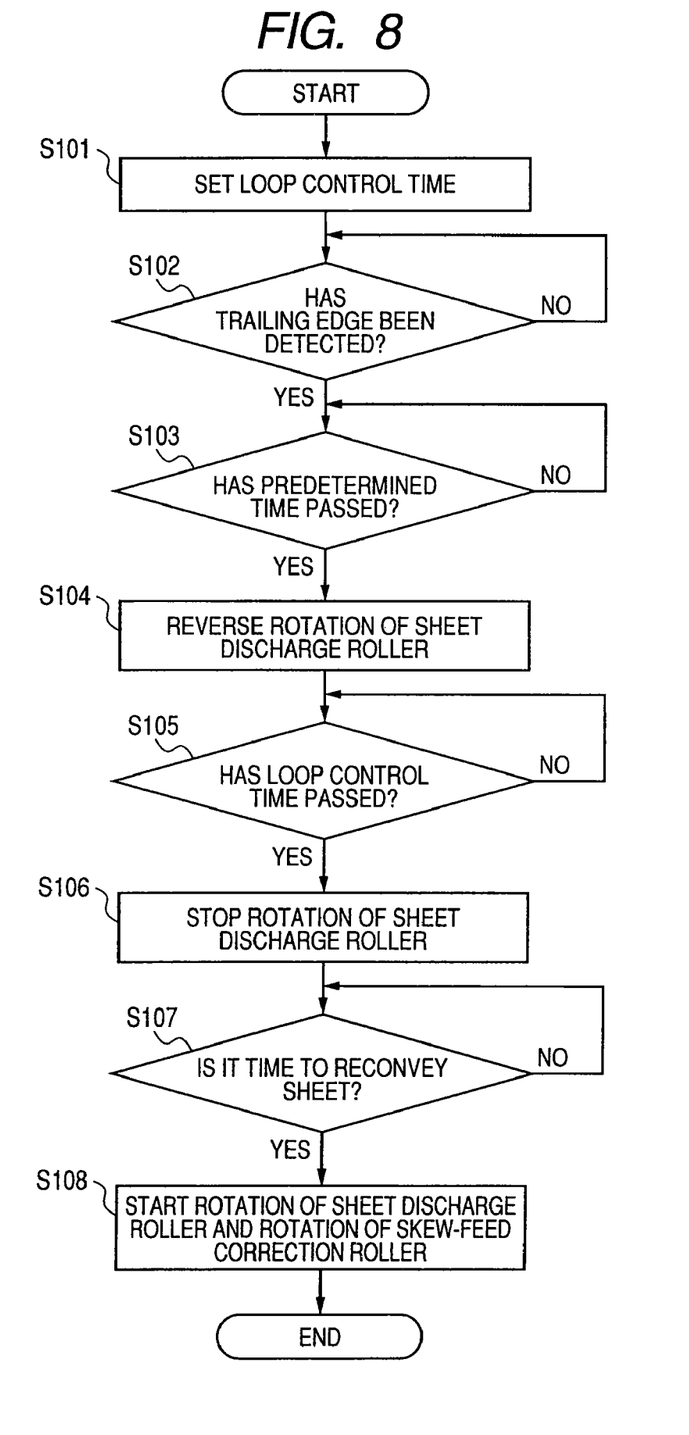
FIG. 8 is a flowchart of skew-feed correcting operations in a modification example.

Incidentally, in the above-mentioned first and second embodiments, after the reverse sensor 40 detects the trailing edge of the sheet S to be conveyed, in the event of changing the skew-correction conveyance amount (rotation amount of the sheet discharge roller pair) by which the sheet discharge roller pair conveys the sheet for correcting the skew-feed of the sheet, the timing when the skew-feed correction roller pair 29 starts to rotate is changed for the purpose of the skew-feed correction by the skew-feed correction roller pair 29. However, the timing concerned may be controlled as follows. Specifically, when the loop control time, which is changed in accordance with the width size of the sheet, has passed since the reverse sensor 40 detected the trailing edge of the sheet S to be conveyed, the rotation of the sheet discharge roller pair 26 is stopped. Through this operation, after the reverse sensor 40 detects the trailing edge of the sheet S, the skew-correction conveyance amount (rotation amount of the sheet discharge roller pair 26) by which the sheet discharge roller pair 26 conveys the sheet is changed for the purpose of the skew-feed correction by the skew-feed correction roller pair 29. Operations in this modification example are described below with reference to a flowchart of FIG. 8.

The controller 200 sets the loop control time in accordance with the basis weight and width size of the sheet to be conveyed with reference to the table of FIG. 9 (S101). The controller 200 determines whether or not a signal indicating that the trailing edge of the sheet S to be conveyed in the direction (first direction) toward the sheet discharge tray by the sheet discharge roller pair 26 has passed through the reverse sensor 40 is received from the reverse sensor 40 (S102). When the signal indicating that the trailing edge of the sheet S has passed through the reverse sensor 40 is input to the controller 200, and the controller 200 has detected the trailing edge of the sheet (YES in S102), the controller 200 determines whether or not a predetermined time has passed since the signal from the reverse sensor 40 was received (S103). When the predetermined time has passed (YES in S103), the controller 200 controls the sheet discharge roller drive motor 261 to reversely rotate the sheet discharge roller pair 26 (S104). The sheet discharge roller pair 26 rotates reversely, and hence the sheet is conveyed toward the duplex conveyance path 28.

The leading edge of the sheet conveyed to the duplex conveyance path 28 by the reverse rotation of the sheet discharge roller pair 26 strikes the skew-feed correction roller pair 29 that has been stopped. Then, the controller 200 determines whether or not the loop control time set in accordance with the width size and the basis weight in S101 has passed since the signal indicating that the trailing edge of the conveyed sheet S has passed through the reverse sensor 40 was sent and received from the reverse sensor 40 (S105). When the loop control time has passed, the controller 200 controls the sheet discharge roller drive motor 261 to stop the rotation of the sheet discharge roller pair 26 (S106). Through the operations, after the reverse sensor 40 detects the trailing edge of the sheet S, the skew-correction conveyance amount (rotation amount of the sheet discharge roller pair 26) by which the sheet discharge roller pair 26 conveys the sheet is changed in accordance with the width size of the sheet and the basis weight of the sheet for the purpose of the skew-feed correction by the skew-feed correction roller pair 29. In other words, as the width size of the sheet becomes smaller, for the purpose of the skew-feed correction by the skew-feed correction roller pair 29, the skew-correction conveyance amount by which the sheet discharge roller pair 26 conveys the sheet is increased (after the reverse sensor 40 detects the trailing edge of the sheet).

After that, when it gets to a reconveyance timing (YES in S107) to resume the conveyance of the sheet, which has been stopped, the controller 200 controls the operations of the sheet discharge roller drive motor 261 and the skew-feed correction roller drive motor 291 so as to rotate the skew-feed correction roller pair 29 and the sheet discharge roller pair 26 (S108). By those operations, the conveyance of the sheet, which has been stopped for the skew-feed correction, is resumed by the sheet discharge roller pair 26 and the skew-feed correction roller pair 29. A determination as to whether it gets to the reconveyance timing to resume the conveyance of the sheet, which has been stopped, is made, for example, in such a manner that the controller 200 determines whether or not a predetermined time longer than the loop control time has passed since the trailing edge of the sheet was detected by the reverse sensor 40. The control according to this modification example can be applied not only to the first embodiment in which the loop is formed in the sheet but also to the second embodiment in which the sheet discharge roller pair and the sheet slip on each other when the leading edge of the sheet strikes the skew-feed correction roller pair 29.

Incidentally, in the above-mentioned first and second embodiments, the description has been made of the configuration in which the two-side reversing is performed by the sheet discharge rollers; however, the present invention is not limited to this configuration. For example, even in a configuration in which the leading edge of the sheet strikes the skew-feed correction member whilst being conveyed by rollers other than the sheet discharge rollers, in the case where the rollers concerned have the difference in conveying characteristics, which is caused depending on the width size of the sheet, a similar effect can be obtained by applying the present invention.

Figure 4:
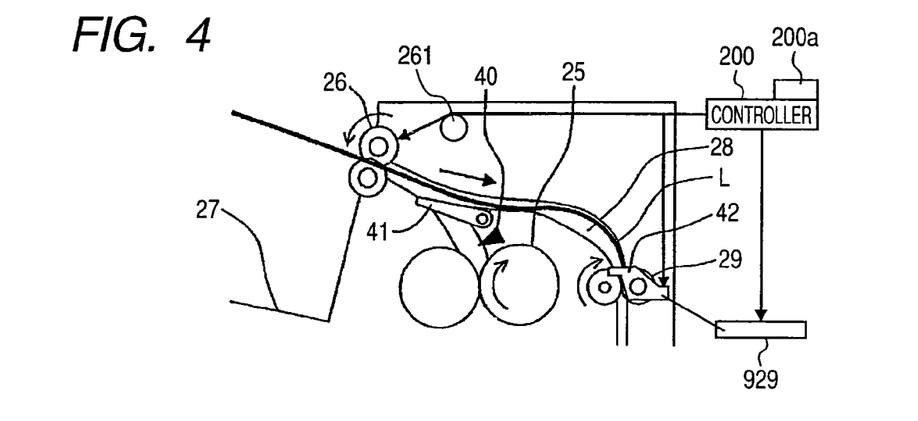
FIG. 4 is an enlarged view of a principal portion of a printer according to a third embodiment of the present invention.

Moreover, the description has been provided so far of the configuration for performing the skew-feed correction in such a manner that the leading edge of the reversed sheet strikes the nip of the skew-feed correction roller pair 29 that is arranged in the duplex conveyance path 28 and conveys the sheet by the rotation thereof. However, the skew-feed correction member struck by the leading edge of the sheet need not be the roller pair that conveys the sheet by the rotation thereof. For example, as illustrated in FIG. 4, that shows an enlarged view of a principal portion of a printer according to a third embodiment of the present invention, a strike shutter (shutter member) 42 that is a skew-feed correction member may be provided in front of the nip of the skew-feed correction roller pair 29. The strike shutter 42 enters the duplex conveyance path 28 so as to be retractable, and switches between a skew-feed correction state as a state of entering the duplex conveyance path 28 and a conveyance-allowed state of being retracted from the duplex conveyance path 28 by using e.g. a solenoid 929 as an actuator or driver.

In the printer including the strike shutter 42 as described above, at the time of the two-sided printing, the drive of the discharge roller pair 26 is switched from the forward rotation direction to the reverse rotation direction after elapse of a predetermined time since the reverse sensor 40 detects that the trailing edge of the sheet S passes through the reverse sensor 40. Following this switching, the conveyance direction of the sheet S is reversed, the sheet S is conveyed toward the duplex conveyance path 28, and after a while, the leading edge of the sheet S strikes the strike shutter 42 that has entered the duplex conveyance path 28 (reconveyance path). After that, the strike shutter 42 is opened at timing corresponding to the loop control time in FIG. 9. In such a way, in a state where the attitude of the sheet is aligned so that the leading edge thereof becomes parallel to the axial direction of the skew-feed correction roller pair 29, that is, in a state where the sheet has been subjected to the skew-feed correction, the sheet concerned enters the nip of the skew-feed correction roller pair 29 that is rotating. When the skew-feed of the sheet is corrected by causing the leading edge of the sheet to strike the strike shutter 42, the sheet discharge roller pair 26 and the sheet may be allowed to slip on each other as in the second embodiment.

In any of the above-mentioned embodiments, there has been illustrated a case where the sheet discharge roller pair that rotates forwardly and reversely conveys the sheet so that the leading edge of the sheet can strike the skew-feed correction member (the skew-feed correction roller pair 29 or the strike shutter 42). However, for example, the skew-feed of the sheet may also be corrected in such a manner that the leading edge of the sheet to be conveyed by the duplex conveyance roller pair 50 strikes the registration roller pair 23 in the stopped state. In this case, a sensor (a detection unit) for detecting the leading edge of the sheet to be conveyed by the duplex conveyance roller pair 50 is provided between the duplex conveyance roller pair 50 and the registration roller pair 23. Then, at timing when the control time has passed since the sensor detected the leading edge of the sheet, the rotation of the registration roller pair 23 is started, or the rotation of the duplex conveyance roller pair 50 is stopped once as in the above-mentioned modification example. The control time here is set longer as the width size of the sheet becomes smaller as in the already-mentioned embodiments. With such a configuration, a conveyance amount by which the duplex conveyance roller pair 50 conveys the sheet for the purpose of the skew-feed correction by the registration roller pair 23 is increased as the length of the sheet in the width direction orthogonal to the sheet conveyance direction gets shorter.

Also in the duplex conveyance roller pair 50, conveying force thereof becomes smaller as the size of the sheet in the width direction becomes smaller. Accordingly, the skew-feed of the sheet becomes prone to occur when the sheet is conveyed by the duplex conveyance roller pair 50. In this embodiment, the conveyance amount by which the duplex conveyance roller pair 50 conveys the sheet for the purpose of the skew-feed correction by the registration roller pair 23 is increased so as to respond to the larger skew-feed that occurs for the narrow sheet. On the other hand, when the wide sheet is conveyed, an amount by which the duplex conveyance roller pair 50 feeds the wide sheet after the leading edge of the wide sheet strikes the registration roller pair 23 that is the skew-feed correction member becomes smaller than in the case of the narrow sheet. Hence, the sheet is prevented from being buckled due to the excessive loop formed on the sheet between the duplex conveyance roller pair 50 and the registration roller pair 23. Here, in the case of the narrow sheet, the conveyance amount by which the duplex conveyance roller pair 50 conveys the sheet for the purpose of the skew-feed correction by the registration roller pair 23 is increased, whereas, in the case of the narrow sheet, the conveying force of the duplex conveyance roller pair 50 becomes smaller than in the case of the wide sheet. Hence, in a state where the leading edge of the narrow sheet contacts the registration roller pair 23, the duplex conveyance roller pair 50 and the narrow sheet are more likely to slip on each other than in the case of the wide sheet. Hence, in the narrow sheet, it is less likely that the excessive loop is formed on the sheet and the sheet is buckled. It has been illustratively described that the skew-feed of the sheet is corrected by causing the leading edge of the sheet, which is to be conveyed by the duplex conveyance roller pair 50, to strike the registration roller pair 23 in the stopped state. However, a configuration may also be adopted, in which the skew-feed of the sheet is corrected by causing the leading edge of the sheet, which is to be conveyed by the retard roller pair 20, to strike the registration roller pair 23 in the stopped state.

The description has been made of the sheet conveying apparatus that conveys the sheet on which the image is formed. However, the present invention may also be applied to a sheet conveying apparatus that conveys, as the sheet, an original from which an image is read by a reading sensor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-111009, filed on Apr. 30, 2009, which is hereby incorporated by reference herein in its entirety.

What is claimed is:

1. A sheet conveying apparatus for conveying sheets of different widths, comprising:
   a conveyance portion configured to convey a sheet along a conveyance path;
   a skew-feed correction member positioned in the conveyance path such that a leading edge of the sheet conveyed by the conveyance portion contacts the skew-feed correction member to correct a skew-feed of the sheet;
   a receiving portion configured to receive information indicative of a width of the conveyed sheet, the width being in a direction orthogonal to a sheet conveyance direction; and
   a control portion configured to adjust a skew-correction conveyance amount of the conveyance portion applied to correct the skew-feed of the sheet by the skew-feed correction member, wherein the skew-correction conveyance amount is adjusted on information which the receiving portion receives such that the skew-correction conveyance amount is set to be larger for a sheet of smaller width compared to a sheet of greater width.

2. A sheet conveying apparatus according to claim 1, wherein the conveyance portion is a roller pair and the conveyance amount corresponds to a rotation amount of the roller pair to correct the skew-feed of the sheet by the skew-feed correction member.

3. A sheet conveying apparatus according to claim 2, further comprising a detection portion which is provided in the conveyance path, and configured to detect the sheet being conveyed,
wherein the skew-correction conveyance amount is adjusted by setting a time period starting from the detection of the sheet by the detection portion such that the set time period is longer for a sheet of smaller width compared to a sheet of greater width.

4. A sheet conveying apparatus according to claim 3, wherein the skew-feed correction member is a second conveyance portion configured to convey the sheet,
wherein the second conveyance portion in a stopped state is contacted by the leading edge of the sheet conveyed by the conveyance portion and then the second conveyance portion starts conveying the sheet, and
wherein the control portion controls the second conveyance portion to start conveying the sheet on expiry of the set time period.

5. A sheet conveying apparatus according to claim 3, wherein the skew-feed correction member comprises a shutter-member movable between a first position in which the leading edge of the sheet conveyed by the conveyance portion is contacted on the shutter member, and a second position in which the shutter member allows the sheet to be conveyed, and
wherein the control portion controls so that the shutter-member moves from the first position to the second position on expiry of the set time period.

6. A sheet conveying apparatus according to claim 3, wherein after conveying the sheet in a first direction, the control portion is configured to control the conveyance portion such that the roller pair rotates reversely to convey the sheet in a second direction reverse to the first direction and such that the leading edge of the sheet conveyed in the second direction by the conveyance portion contacts the skew-feed correction member, and wherein
the control portion is configured to control the conveyance portion to start conveyance of the sheet in the second direction based on a detection result from the detection portion on detecting the sheet conveyed in the first direction by the conveyance portion.

7. A sheet conveying apparatus according to claim 6, wherein the conveyance portion comprises a roller which discharges the sheet onto a tray by conveying the sheet in the first direction.

8. A sheet conveying apparatus according to claim 3, wherein the control portion is configured to switch a state of the skew-feed correction member between a skew-feed correction state in which the leading edge of the sheet conveyed by the conveyance portion is contacted on the skew-feed correction member to correct the skew-feed of the sheet, and a conveyance-allowed state in which the skew-feed correction member allows conveyance of the sheet having corrected its skew-feed by the leading edge contacts on the skew-feed correction member, and wherein
the smaller the detected length of the sheet in the width direction, the greater the control portion lengthens a time period from a time when the detection portion detects the sheet conveyed by the conveyance portion to a time when the skew-feed correction member in the skew-feed correction state is switched to the conveyance-allowed state.

9. A sheet conveying apparatus according to claim 1, wherein the receiving portion is configured to receive information indicative of at least one of the type and weight of the sheet and wherein the control portion is configured to use the received information in adjusting the skew-correction conveyance amount.

10. A sheet conveying apparatus according to claim 1, wherein the smaller the detected width of the sheet, the greater the control portion increases, step by step, the skew-correction conveyance amount required to correct the skew-feed of the sheet by the skew-feed correction member.

11. A sheet conveying apparatus according to claim 1 further comprising a detection portion which is provided in the conveyance path, and configured to detects the sheet being conveyed,
wherein the skew-feed correction member comprises a skew-feed correction roller pair, operable in a stopped mode and against which, when in said stopped mode, the leading edge of the sheet conveyed by the conveyance portion is contacted to correct the skew-feed of the sheet, and operable in a rotating mode to convey the sheet, and
the control portion is configured to increase the skew-correction conveyance amount of the conveyance portion for a time period from a time when the detection portion detects the sheet to a time when the skew-feed correction roller pair starts to rotate in order to start to convey the sheet.

12. A sheet conveying apparatus according to claim 1 further comprising a detection portion which is provided in the conveyance path, and configured to detects the sheet being conveyed,
wherein the skew-feed correction member comprises a shutter member that moves between a first position in which the leading edge of the sheet conveyed by the conveyance portion is contacted on the shutter member, and a second position in which the shutter member allows the sheet to be conveyed, and
the smaller the detected length of the sheet in the width direction, the greater the control portion increases the conveyance amount of the conveyance portion for a time period from a time when the detection portion detects the sheet to a time when the shutter member located at the first position moves to the second position.

13. A sheet conveying apparatus according to claim 1, wherein the receiving portion is configured to receive information indicative of at least one of the type and weight of the sheet and wherein the control portion is configured to use the received information in adjusting the skew-correction conveyance amount.

14. A sheet conveying apparatus according to claim 1, wherein the conveyance portion is configured to rotate reversely after conveying the sheet in a first direction, to convey the sheet in a second direction reverse to the first direction, and
the leading edge of the sheet conveyed in the second direction by the conveyance portion contacts the skew-feed correction member.

15. An image forming apparatus comprising:
an image forming portion that forms an image on a sheet;
a conveyance portion configured to convey the sheet on which the image is formed by the image forming portion along a conveyance path;
a skew-feed correction member positioned in the conveyance path such that a leading edge of the sheet conveyed by the conveyance portion contacts the skew-feed correction member to correct a skew-feed of the sheet;

a receiving portion configured to receive information indicative of a width of the conveyed sheet, the width being in a direction orthogonal to a sheet conveyance direction; and a control portion configured to adjust a skew-correction conveyance amount of the conveyance portion applied to correct the skew-feed of the sheet by the skew-feed correction member, wherein the skew-correction conveyance amount is adjusted on information which the receiving portion received such that the skew-correction conveyance amount is set to be larger for a sheet of smaller width compared to a sheet of greater width.

16. An image forming apparatus according to claim 15, wherein the conveyance portion is a roller pair and the conveyance amount corresponds to a rotation amount of the roller pair to correct the skew-feed of the sheet by the skew-feed correction member.

17. An image forming apparatus according to claim 15, further comprising a detection portion which is provided in the conveyance path, and configured to detect the sheet being conveyed,
wherein the skew-correction conveyance amount is adjusted by setting a time period starting from the detection of the sheet by the detection portion such that the set time period is longer for a sheet of smaller width compared to a sheet of greater width.

18. An image forming apparatus according to claim 15, wherein the skew-feed correction member is a second conveyance portion configured to convey the sheet,
wherein the second conveyance portion in a stopped state is struck la the leading edge of the sheet conveyed by the conveyance portion and then the second conveyance portion starts conveying the sheet, and
wherein the control portion controls the second conveyance portion to start conveying the sheet on expiry of the set time period.

19. An image forming apparatus according to claim 17, wherein the skew-feed correction member comprises a shutter-member movable between a first position in which the leading edge of the sheet conveyed by the conveyance portion is struck on the shutter member, and a second position in which the shutter member allows the sheet to be conveyed, and
wherein the control portion controls so that the shutter-member moves from the first position to the second position on expiry of the set time period.

20. An image forming apparatus according to claim 17, wherein after conveying the sheet in a first direction, the control portion is configured to control the conveyance portion such that the roller pair rotates reversely to convey the sheet in a second direction reverse to the first direction and such that the leading edge of the sheet conveyed in the second direction by the conveyance portion strikes the skew-feed correction member, and wherein
the control portion is configured to control the conveyance portion to start conveyance of the sheet in the second direction based on a detection result from the detection portion on detecting the sheet conveyed in the first direction by the conveyance portion.

21. An image forming apparatus according to claim 20, wherein the conveyance portion comprises a roller which discharges the sheet onto a tray by conveying the sheet in the first direction.

22. An image forming apparatus according to claim 17, wherein the control portion is configured to switch a state of the skew-feed correction member between a skew-feed correction state in which the leading edge of the sheet conveyed by the conveyance portion is struck on the skew-feed correction member to correct the skew-feed of the sheet, and a conveyance-allowed state in which the skew-feed correction member allows conveyance of the sheet having corrected skew-feed by the leading edge struck on the skew-feed correction member, and wherein
the smaller the detected length of the sheet in the width direction, the greater the control portion lengthens a time period from a time when the detection portion detects the sheet conveyed by the conveyance portion to a time when the skew-feed correction member in the skew-feed correction state is switched to the conveyance-allowed state.

23. An image forming apparatus according to claim 15, wherein the smaller the detected width of the sheet, the greater the control portion increases, step by step, the skew-correction conveyance amount required to correct the skew-feed of the sheet by the skew-feed correction member after the detection portion detects the sheet.

24. An image forming apparatus according to claim 15 further comprising a detection portion which is provided in the conveyance path, and configured to detects the sheet being conveyed,
wherein the skew-feed correction member comprises a skew-feed correction roller pair, operable in a stopped mode and against which, when in said stopped mode, the leading edge of the sheet conveyed by the conveyance portion is struck to correct the skew-feed of the sheet, and operable in a rotating mode to convey the sheet, and
the control portion is configured to increases the skew-correction conveyance amount of the conveyance portion for a time period from a time when the detection portion detects the sheet to a time when the skew-feed correction roller pair starts to rotate in order to start to convey the sheet.

25. An image forming apparatus according to claim 15 further comprising a detection portion which is provided in the conveyance path, and configured to detects the sheet being conveyed,
wherein the skew-feed correction member comprises a shutter member that moves between a first position in which the leading edge of the sheet conveyed by the conveyance portion is struck on the shutter member, and a second position in which the shutter member allows the sheet to be conveyed, and
the smaller the detected length of the sheet in the width direction, the greater the control portion increases the conveyance amount of the conveyance portion for a time period from a time when the detection portion detects the sheet to a time when the shutter member located at the first position moves to the second position.

26. An image forming apparatus according to claim 15, wherein the conveyance portion is configured to rotate reversely after conveying the sheet in a first direction, to convey the sheet in a second direction reverse to the first direction, and
the leading edge of the sheet conveyed in the second direction by the conveyance portion contacts the skew-feed correction member.

* * * * *